US009293261B2

(12) United States Patent  (10) Patent No.: US 9,293,261 B2
Saito et al.  (45) Date of Patent:  Mar. 22, 2016

(54) MULTILAYER CERAMIC CAPACITOR

(71) Applicant: TAIYO YUDEN CO., LTD., Taito-ku, Tokyo (JP)

(72) Inventors: Kenji Saito, Takasaki (JP); Koichiro Morita, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 284 days.

(21) Appl. No.: 14/033,189

(22) Filed: Sep. 20, 2013

(65) Prior Publication Data

US 2014/0085768 A1  Mar. 27, 2014

(30) Foreign Application Priority Data

Sep. 27, 2012 (JP) .................................. 2012-214219
Aug. 19, 2013 (JP) .................................. 2013-169766

(51) Int. Cl.
   | | |
   |---|---|
   | *H01G 4/30* | (2006.01) |
   | *H01G 4/005* | (2006.01) |
   | *H01G 4/06* | (2006.01) |
   | *H01G 4/228* | (2006.01) |
   | *H01G 4/12* | (2006.01) |
   | *H01G 4/255* | (2006.01) |

(52) U.S. Cl.
   CPC . *H01G 4/30* (2013.01); *H01G 4/12* (2013.01); *H01G 4/255* (2013.01)

(58) Field of Classification Search
   CPC ........ H01G 4/30; H01G 4/1227; H01G 4/232
   USPC .............. 361/321.1, 321.2, 306.1, 301.4, 303
   See application file for complete search history.

(56) References Cited

U.S. PATENT DOCUMENTS 6,201,683 B1 *   3/2001  Yamada et al. ............ 361/308.1
2011/0157765 A1 *   6/2011  Kim et al. ..................... 361/303

FOREIGN PATENT DOCUMENTS

JP   2001-338828 A   12/2001

OTHER PUBLICATIONS

An Office Action issued by Korean Patent Office, mailed Jan. 9, 2015, for Korean counterpart application No. 10-2013-0102875.

* cited by examiner

*Primary Examiner* — Eric Thomas
*Assistant Examiner* — Arun Ramaswamy
(74) *Attorney, Agent, or Firm* — Law Office of Katsuhiro Arai

(57) ABSTRACT

A multilayer ceramic capacitor, whose CR product can be prevented from dropping with certainty even at a thickness of 1.0 μm or less, includes multiple unit capacitors wherein a part constituted by two adjacent internal electrode layers in the laminating direction and one dielectric layer present between the two internal electrode layers is defined as a unit capacitor. The capacitances of the unit capacitors arranged in the laminating direction exhibit a distribution that gradually increases from both ends in the laminating direction toward the inside, while gradually decreasing from the two apexes of increase toward the center in the laminating direction.

16 Claims, 3 Drawing Sheets

Fig.3

|  | Thickness of dielectric layer (μm) | Sintering suppressant (wt%) | Rate of rise in temperature (°C/hr) | (Cp-Co)/Co (%) | (Cp-Cs)/Cs (%) | Ncp | CR product (ΩF) |
|---|---|---|---|---|---|---|---|
| Sample 1a | 1.0 | 0.5 | 10000 | 12.1 | 7.7 | UC6&94 | 1400 |
| Sample 1b | 1.0 | 0.5 | 7000 | 8.4 | 5.1 | UC6&94 | 1340 |
| Sample 1c | 1.0 | 0.5 | 5000 | 3.2 | 3.0 | UC5&95 | 1220 |
| Sample 1d | 1.0 | 0.5 | 4500 | 2.6 | 2.5 | UC5&95 | 1040 |
| Sample 1e | 1.0 | 0 | 600 | --- | --- | --- | 1000 |
| Sample 1f | 1.0 | 5.0 | 5000 | 15.2 | 3.5 | UC5&95 | 1380 |
| Sample 1g | 1.0 | 3.0 | 5000 | 9.3 | 3.2 | UC5&95 | 1330 |
| Sample 2a | 0.8 | 0.5 | 10000 | 14.8 | 7.5 | UC6&94 | 990 |
| Sample 2b | 0.8 | 0.5 | 7000 | 9.7 | 5.3 | UC6&94 | 850 |
| Sample 2c | 0.8 | 0.5 | 5000 | 3.4 | 3.1 | UC5&95 | 730 |
| Sample 2d | 0.8 | 0.5 | 4500 | 2.5 | 2.4 | UC5&95 | 630 |
| Sample 2e | 0.8 | 0 | 600 | --- | --- | --- | 610 |
| Sample 2f | 0.8 | 5.0 | 5000 | 16.0 | 3.5 | UC5&95 | 880 |
| Sample 2g | 0.8 | 3.0 | 5000 | 11.2 | 3.3 | UC5&95 | 840 |
| Sample 3a | 3.0 | 0.5 | 10000 | 10.0 | 6.9 | UC6&94 | 1300 |
| Sample 3b | 3.0 | 0.5 | 7000 | 6.3 | 5.0 | UC6&94 | 1280 |
| Sample 3c | 3.0 | 0.5 | 5000 | 3.1 | 3.0 | UC5&95 | 1270 |
| Sample 3d | 3.0 | 0.5 | 4500 | 2.6 | 2.6 | UC5&95 | 1110 |
| Sample 3e | 3.0 | 0 | 600 | --- | --- | --- | 1060 |
| Sample 3f | 3.0 | 5.0 | 5000 | 11.5 | 3.2 | UC5&95 | 1270 |
| Sample 3g | 3.0 | 3.0 | 5000 | 7.8 | 3.2 | UC5&95 | 1260 |

MULTILAYER CERAMIC CAPACITOR

BACKGROUND

1. Field of the Invention

The present invention relates to a multilayer ceramic capacitor comprising a capacitor body of a structure where multiple internal electrode layers are laminated via dielectric layers.

2. Description of the Related Art

The need for reducing the size and increasing the capacity of this type of multilayer ceramic capacitor is still high, and to satisfy this need, further thickness reduction of internal electrode layers and dielectric layers is inevitable. As the thickness of dielectric layers becomes increasingly thinner, however, the CR product (product of capacitance C and insulation resistance R) of the multilayer ceramic capacitor tends to drop. Note that the CR product is widely known as a value representing the characteristics of the multilayer ceramic capacitor, and generally the lower limit of CR product is set according to the nominal capacitance.

Patent Literature 1 below describes an invention that limits the grain size and volume ratio of the dielectric layer crystal contained in the dielectric layer whose thickness is 2.5 µm or less so as to prevent the CR product from dropping, but since accurately limiting the grain size and volume ratio of the dielectric layer crystal is difficult due to the limitations of the manufacturing method, drop in CR product may not be prevented as expected.

BACKGROUND ART LITERATURES

[Patent Literature 1] Japanese Patent Laid-open No. 2001-338828

SUMMARY

An object of the present invention is to provide a multilayer ceramic capacitor whose CR product can be prevented from dropping with certainty even when the dielectric layer becomes thinner, such as when its thickness becomes 1.0 µm or less, for example.

To achieve the aforementioned object, the present invention provides a multilayer ceramic capacitor comprising a capacitor body of a structure where multiple internal electrode layers are laminated via dielectric layers, wherein, when the part constituted by two adjacent internal electrode layers in the laminating direction and one dielectric layer present between the two internal electrode layers is considered a unit capacitor, then the capacitances of multiple unit capacitors arranged in the laminating direction form a distribution that gradually increases from both sides in the laminating direction toward the inside, while gradually decreasing from the two apexes of increase toward the center in the laminating direction. In some embodiments, the term "gradually" refers to continuously, steadily, progressively, incrementally, and/or without sudden changes.

According to the present invention, a multilayer ceramic capacitor is provided whose CR product can be inhibited from dropping with certainty even when the dielectric layer becomes thinner, such as when its thickness becomes 1.0 µm or less, for example.

The aforementioned and other objects of the present invention and the characteristics and effects according to each object are made clear by the following explanations and drawings attached hereto.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

DESCRIPTION OF THE SYMBOLS

10—Multilayer ceramic capacitor, 11—Capacitor body, 12—Internal electrode layer, 13—Dielectric layer, 14—External electrode, UC—Unit capacitor.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

(A) in FIG. 1 is a longitudinal section view of a multilayer ceramic capacitor to which the present invention is applied; (B) in FIG. 1 is a lateral section view of the multilayer ceramic capacitor cut along line B-B in (A) in FIG. 1; (C) in FIG. 1 is a drawing showing an equivalent circuit of the multilayer ceramic capacitor; and (D) in FIG. 1 is a drawing showing the capacitance distribution of the unit capacitor in the multilayer ceramic capacitor.

FIG. 3 is a table showing the specifications and characteristics of a sample corresponding to the multilayer ceramic capacitor in FIG. 1.

STRUCTURE OF MULTILAYER CERAMIC CAPACITOR AND CAPACITANCE DISTRIBUTION OF UNIT CAPACITOR IN MULTILAYER CERAMIC CAPACITOR

Figure 1:
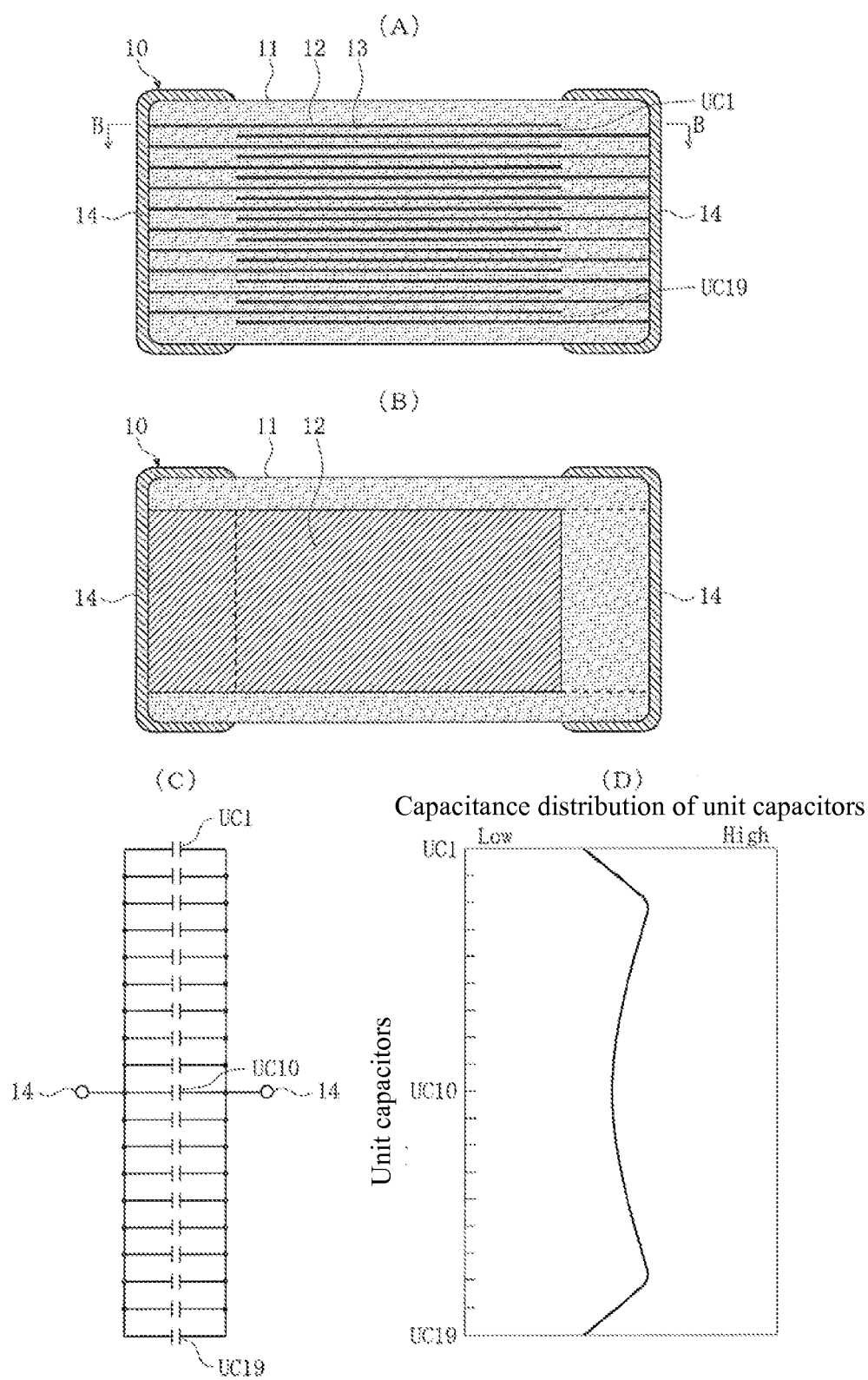

First, (A) in FIG. 1 to (D) in FIG. 1 are referenced to explain the structure of a multilayer ceramic capacitor 10 to which the present invention is applied, as well as the capacitance distribution of the unit capacitor in the multilayer ceramic capacitor 10.

The multilayer ceramic capacitor 10 shown in (A) in FIG. 1 and (B) in FIG. 1 has a capacitor body 11 of roughly rectangular solid shape and a pair of external electrodes 14 provided on both ends of the capacitor body 11 in its length direction, where the reference dimensions have the relationship of "Length>Width=Height" or "Length>Width>Height." It should be noted that the length represents the dimension in the lateral direction in (A) in FIG. 1, width represents the dimension in the vertical direction in (B) in FIG. 1, and height represents the dimension in the vertical direction in (A) in FIG. 1.

The capacitor body 11 has a structure where a total of 20 internal electrode layers 12 are laminated via dielectric layers 13 (totaling 19), and a top protection part and bottom protection part (not denoted by symbols) are provided above the top internal electrode layer 12 and below the bottom internal electrode layer 12, respectively, each protection part constituted only by multiple dielectric layers 13 laminated together. Additionally, since the width of each internal electrode layer 12 is smaller than the width of the dielectric layer 13, a margin (not denoted by symbol) formed only by multiple dielectric layers 13 alone is present on one side and the other side of the capacitor body 11 in its width direction. Note that, although the number of internal electrode layers 12 is 20 in (A) in FIG. 1 and (B) in FIG. 1 for the purpose of illustrative convenience, the number of internal electrode layers constituting an actual multilayer ceramic capacitor meeting the need for size reduction and capacity increase can be as many as 100 or even more.

Each internal electrode layer 12 is formed by nickel, copper, palladium, platinum, silver, gold, or alloy thereof, and the like, where each layer is made of the same material and has roughly the same thickness and shape (roughly rectangular). Each dielectric layer 13, including each dielectric layer 13 constituting the top protection part or bottom protection part, is formed by barium titanate, strontium titanate, calcium titanate, magnesium titanate, calcium zirconate, calcium zirconate titanate, barium zirconate, or titanium oxide, and the like, where each layer is made of the same material and has roughly the same thickness and shape (roughly rectangular), and each layer has a shape longer and wider than the shape of each internal electrode layer 12.

Of the total 20 internal electrode layers 12, the odd-numbered internal electrode layers 12 (totaling 10) from the top and even-numbered internal electrode layers 12 (totaling 10) from the top in (A) in FIG. 1 are staggered in the length direction, where the ends of the odd-numbered internal electrode layers 12 from the top are electrically connected to the left external electrode 14, while the ends of the even-numbered internal electrode layers 12 from the top are electrically connected to the right external electrode 14.

Each external electrode 14 has a double-layer structure constituted by a base layer (not denoted by symbol) contacting both ends of the capacitor body 11 in its length direction and a surface layer formed on the surface of the base layer, or a multi-layer structure having at least one intermediate layer between the base layer and surface layer. Preferably the base layer is formed by the same material as the internal electrode layer 12, the surface layer is formed by tin, palladium, gold, zinc, etc., and the intermediate layer is formed by platinum, palladium, gold, copper, nickel, etc.

When the part constituted by two adjacent internal electrode layers 12 in the vertical direction, or specifically in the laminating direction, of the capacitor body 11 and one dielectric layer 13 present between the two internal electrode layers 12 is considered a unit capacitor, then the multilayer ceramic capacitor 10 includes a total of 19 unit capacitors UC1 to UC19 arranged in the laminating direction and the unit capacitors UC1 to UC19 are connected in parallel to the pair of external electrodes 14, as shown in (C) in FIG. 1.

Also with the multilayer ceramic capacitor 10, the capacitances of the total of 19 unit capacitors UC1 to UC19 arranged in the laminating direction form a distribution of roughly a W shape that gradually increases from both sides in the laminating direction toward the inside, while gradually decreasing from the two apexes of increase toward the center in the laminating direction, as shown by the thick solid line in (D) in FIG. 1. In addition, the capacitances of the unit capacitor UC1 and UC19 on both sides in the laminating direction are smaller than the capacitance of the unit capacitor UC10 at the center in the laminating direction.

Example of Manufacturing Method of Multilayer Ceramic Capacitor

Next, a favorable example of manufacturing method to obtain the multilayer ceramic capacitor 10 is explained, where a case in which each internal electrode layer 12 is formed by nickel and each dielectric layer 13 is formed by barium titanate is used as an example.

For manufacturing, a base slurry containing barium titanate powder, ethanol (solvent), polyvinyl butyral (binder), and dispersant and other additives, is prepared, to provide a first dielectric layer slurry obtained by adding sintering suppressant to the base slurry and a second dielectric layer slurry obtained by adding sintering auxiliary to the base slurry. Rare earth oxide can be used for the sintering suppressant in the first dielectric layer slurry, for example, and silica or glass compound can be used for the sintering auxiliary in the second dielectric layer slurry, for example. A desired amount by which to add each of the above is 0.5 to 5.0 percent by weight, for example. Also, an internal electrode layer paste containing nickel powder, terpineol (solvent), ethyl cellulose (binder), and dispersant and other additives, is prepared.

Then, a die-coater, etc., is used to apply the first dielectric layer slurry onto a carrier film to the specified thickness and width, after which the film is dried to produce a first sheet (containing the sintering suppressant). Also, a die-coater, etc., is used to apply the second dielectric layer slurry onto a carrier film to the specified thickness and width, after which the film is dried to produce a second sheet (containing the sintering auxiliary). Furthermore, a screen printer, etc., is used to apply the internal electrode layer paste onto the second sheet to the specified thickness and shape in a matrix or zigzag pattern, after which the sheet is dried to produce a third sheet on which internal electrode layer patterns are formed.

Then, a pickup head with stamping blade and heater, etc., is used to laminate and thermally bond a specified number of first unit sheets (containing the sintering suppressant) that have been stamped to the specified shape from the first sheet, after which a specified number of second unit sheets (containing the sintering auxiliary and having internal electrode layer patterns on them) that have been stamped to the specified shape from the third sheet are laminated and thermally bonded on top, after which a specified number of first unit sheets (containing the sintering suppressant) that have been stamped to the specified shape from the first sheet are laminated and thermally bonded on top, and the obtained laminate is finally thermally bonded using a hot hydrostatic press machine, etc., to produce a non-sintered laminated sheet.

Then, the non-sintered laminated sheet is cut to grid using a dicing machine, etc., to produce non-sintered chips, each corresponding to the capacitor body 11.

Then, many non-sintered chips are put in a sintering furnace and sintered (including binder removal and sintering) in a reducing ambience or ambience of low partial oxygen pressure based on a temperature profile appropriate for the nickel powder and barium titanate powder. An essential point of this sintering process is to raise the temperature quickly, such as at a rate of 5000 to 10000° C./hr, during sintering to actively cause the progress of sintering to drop from the surface of the non-sintered chip toward the center.

Then, a roller coater, etc., is used to apply an external electrode paste (the internal electrode layer paste is diverted for this purpose) on both ends of the sintered chip in its length direction and then the chip is baked in the same ambience as mentioned above to form a base layer, after which a surface layer, or an intermediate layer and surface layer, is/are formed by electroplating, etc., on the surface of the base layer to produce a pair of external electrodes.

Structure and Manufacturing Method of Samples

Next, the structure and manufacturing method of samples 1a to 1g, 2a to 2g, 3a to 3g, prepared for checking the aforementioned capacitance distribution, etc., are explained.

The samples 1a to 1g, 2a to 2g, and 3a to 3g are each a multilayer ceramic capacitor having a structure equivalent to that of the multilayer ceramic capacitor 10, where the reference length and width dimensions of each sample are 1.0 mm and 0.5 mm, respectively, the number of internal electrode layers 12 is 100, and average thickness of the internal electrode layer 12 is 1.2 μm. In this disclosure, the term "average" refers to an average of all the samples (or the entire areas) at issue, an average of randomly selected samples (or areas) at issue, an average of samples (or areas) representing all the samples (or the entire areas) at issue, or an average equivalent to the foregoing.

Also, the samples 1a to 1g, 2a to 2g, and 3a to 3g are such that the average thickness of the dielectric layer 13 is 1.0 μm for samples 1a to 1g, 0.8 μm for samples 2a to 2g, and 3.0 μm for samples 3a to 3g (refer to FIG. 3).

Note that the thickness of the top protection part and that of the bottom protection part is approx. 30 μm with samples 1a to 1g, 2a to 2g, and 3a to 3g, and this value is adjusted by the number of first unit sheets laminated in the production process of non-sintered laminated sheets as described in <<Example of Manufacturing Method of Multilayer Ceramic Capacitor>> above.

The samples 1a to 1g, 2a to 2g, and 3a to 3g were manufactured according to the manufacturing method described in <<Example of Manufacturing Method of Multilayer Ceramic Capacitor>> above, where the respective internal electrode layers 12 are formed by nickel and dielectric layers 13 by barium titanate, and the amount of sintering auxiliary contained in the second dielectric layer slurry used in manufacturing is 0.5 percent by weight.

Also, the amount of sintering suppressant contained in the first dielectric slurry used in the manufacturing of samples 1a to 1g, 2a to 2g, and 3a to 3g is 0.5 percent by weight for samples 1a, 2a, 3a, 0.5 percent by weight for samples 1b, 2b, 3b, 0.5 percent by weight for samples 1c, 2c, 3c, 0.5 percent by weight for samples 1d, 2d, 3d, 0 percent by weight for samples 1e, 2e, 3e, 5.0 percent by weight for samples 1f, 2f, 3f, and 3.0 percent by weight for samples 1g, 2g, 3g (refer to FIG. 3).

Also, the rate of rise in temperature during the sintering process in the manufacturing of samples 1a to 1g, 2a to 2g, and 3a to 3g is 10000° C./hr for samples 1a, 2a, 3a (quick temperature rise), 7000° C./hr for samples 1b, 2b, 3b (quick temperature rise), 5000° C./hr for samples 1c, 2c, 3c (quick temperature rise), 4500° C./hr which is lower than quick temperature rise for samples 1d, 2d, 3d, 600° C./hr corresponding to normal temperature rise for samples 1e, 2e, 3e, 5000° C./hr for samples 1f, 2f, 3f (quick temperature rise), and 5000° C./hr for samples 1g, 2g, 3g (quick temperature rise) (refer to FIG. 3).

Furthermore, when the part constituted by two adjacent internal electrode layers 12 in the laminating direction and one dielectric layer 13 present between the two internal electrode layers 12 is considered a unit capacitor, then the samples 1a to 1g, 2a to 2g, and 3a to 3g each include a total of 99 unit capacitors UC1 to UC99 arranged in the laminating direction (refer to FIG. 2) and the unit capacitors UC1 to UC99 are connected in parallel to the pair of external electrodes 14.

Capacitance Distributions of Unit Capacitors in Samples

Figure 2:
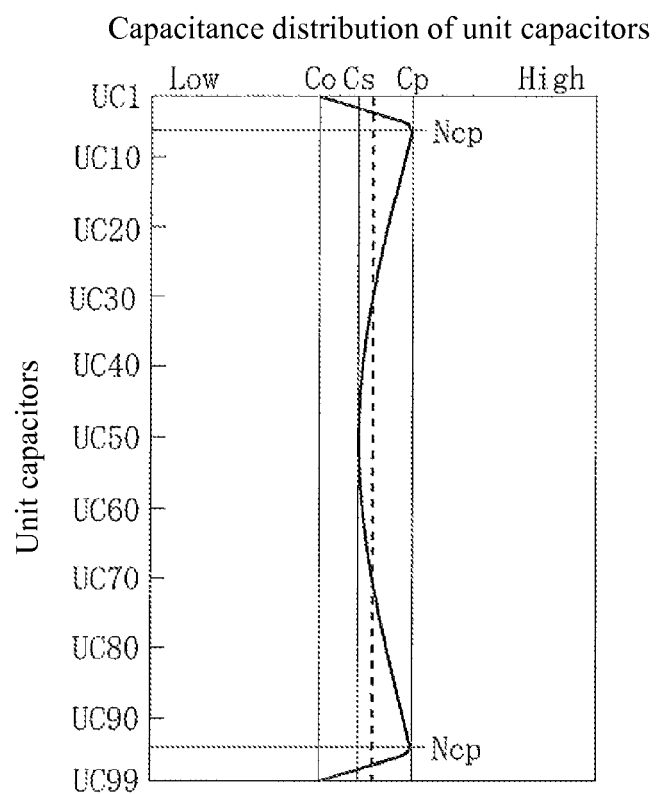
FIG. 2 is a drawing showing the capacitance distribution of the unit capacitor in a sample corresponding to the multilayer ceramic capacitor in FIG. 1.

Next, FIG. 2 is referenced to explain the capacitance distributions of unit capacitors in the samples 1a to 1g, 2a to 2g, and 3a to 3g.

The thick solid line in FIG. 2 indicates the capacitance distribution of unit capacitors UC1 to UC99 in the sample 1a, while the thick broken line in FIG. 2 indicates the capacitance distribution of unit capacitors UC1 to UC99 in the sample 1e. The capacitance distributions indicated by the thick solid line and thick broken line in FIG. 2 are based on the results of preparing 10 units of the samples 1a and 1e, respectively, by removing the pair of external electrodes 14 from each, and then using a manual prober and LCR meter (4284A by Agilent) to separately measure the capacitances of the total of 99 unit capacitors UC1 to UC99 in the sample units (each result represents an average of 10 units).

As shown by the thick solid line in FIG. 2, with the sample 1a the capacitances of the total of 99 unit capacitors UC1 to UC99 arranged in the laminating direction form a distribution of roughly W shape that gradually increases from both sides in the laminating direction (refer to Co) toward the inside, while gradually decreasing from the two apexes of increase (refer to Cp) toward the center in the laminating direction (refer to Cs). Additionally, the capacitances of the unit capacitors UC1 and UC99 on both sides in the laminating direction are smaller than the capacitance Cs of the unit capacitor UC50 at the center in the laminating direction. As shown by the thick broken line in FIG. 2, on the other hand, with the sample 1e the capacitances of the total of 99 unit capacitors UC1 to UC99 arranged in the laminating direction form a roughly linear distribution.

Note that Ncp in FIG. 2 represents the unit capacitor number corresponding to each of the two apexes of increase (refer to Cp) (UC6 and UC94 in FIG. 2; refer to FIG. 3).

Although not illustrated, when the samples 1b to 1d, 1f, 1g, 2a to 2g, and 3a to 3g were measured in the same manner as above, the capacitances of the unit capacitors UC1 to UC99 in the samples 1b to 1d, 1f, 1g, 2a to 2d, 2f, 2g, 3a to 3d, 3f, and 3g were confirmed to form a distribution of roughly W shape like the one indicated by the thick solid line in FIG. 2. On the other hand, the capacitances of the unit capacitors UC1 to UC99 in the samples 2e and 3e were confirmed to form a roughly linear distribution like the one indicated by the thick broken line in FIG. 2.

Also, it was revealed from the aforementioned measurement that the distribution of roughly W shape (refer to the thick solid line in FIG. 2) had three types including one where the thick solid line representing the distribution was roughly smooth, one where the thick solid line representing the distribution was jagged, and one being a combination of the two. On the other hand, the roughly linear distribution (refer to the thick broken line in FIG. 2) had three types including one where the thick broken line representing the distribution was roughly smooth, one where the thick broken line representing the distribution was jagged, and one being a combination of the two.

Note that the maximum undulation of the jagged line confirmed in the aforementioned measurement was 2.0% when indicated by [Difference between the capacitances of two adjacent unit capacitors]/[Lower of the capacitances of two adjacent unit capacitors].

Characteristics (Including Effects) of Samples

Next, FIG. 3 is referenced to explain the characteristics (including effects) of the samples 1a to 1g, 2a to 2g, and 3a to 3g.

"(Cp−Co)/Co (%)" in FIG. 3 represents a percent difference, with reference to Co, between Cp (average capacitance of the unit capacitors corresponding to the two apexes of increase) and Co (average capacitance of the unit capacitors on both sides in the laminating direction (UC1 and UC99)), based on the capacitance of each unit capacitor measured in the same manner as above for 10 units each of the samples 1a to 1d, 1f, 1g, 2a to 2d, 2f, 2g, 3a to 3d, 3f, and 3g (each result represents an average of 10 units). As mentioned earlier, the samples 1e, 2e, and 3e correspond to the "roughly linear distribution (refer to the thick broken line in FIG. 2)" and therefore (Cp−Co)/Co (%) is not indicated for these samples.

Also, "(Cp−Cs)/Cs (%)" in FIG. 3 represents a percent difference, with reference to Cs, between Cp (average capacitance of the unit capacitors corresponding to the two apexes of increase) and Cs (capacitance of the unit capacitor at the center in the laminating direction (UC50)), based on the capacitance of each unit capacitor measured in the same manner as above for 10 units each of the samples 1a to 1d, 1f, 1g, 2a to 2d, 2f, 2g, 3a to 3d, 3f, and 3g (each result represents an average of 10 units). As mentioned earlier, the samples 1e, 2e, and 3e correspond to the "roughly linear distribution (refer to the thick broken line in FIG. 2)" and therefore (Cp−Cs)/Cs (%) is not indicated for these samples.

Furthermore, "Ncp" in FIG. 3 represents the unit capacitor number corresponding to each of the two apexes of increase, based on the capacitance of each unit capacitor measured in the same manner as above for 10 units each of the samples 1a to 1d, 1f, 1g, 2a to 2d, 2f, 2g, 3a to 3d, 3f, and 3g. Note that, when the unit capacitor numbers corresponding to the two apexes of increase varied among the 10 units, the most frequently appearing unit capacitor number among the 10 units was defined as Ncp. As mentioned earlier, the samples 1e, 2e, and 3e correspond to the "roughly linear distribution (refer to the thick broken line in FIG. 2)" and therefore Ncp is not indicated for these samples.

In addition, "CR product (ΩF)" in FIG. 3 represents the product of capacitance and insulation resistance measured for 10 units each of the samples 1a to 1g, 2a to 2g, and 3a to 3g, where the capacitance of each sample unit was measured using a LCR meter (4284A by Agilent) and insulation resistance, using an insulation resistance tester (R8340A by ADC). Note that the insulation resistance was measured by applying 1 V of direct current for 20 seconds and then immediately measuring the electrical resistance.

The following can be said about the samples 1a to 1g, 2a to 2g, and 3a to 3g based on the values of (Cp−Co)/Co (%), (Cp−Cs)/Cs (%), Ncp and CR product (ΩF) in FIG. 3, among others.

(1) Of the samples 1a to 1g, the sample 1e corresponding to the "roughly linear distribution (refer to the thick broken line in FIG. 2)" has a CR product (ΩF) of 1000 ΩF. On the other hand, the CR products (ΩF) of the samples 1a to 1d, 1f, 1g corresponding to the distribution of roughly W shape (refer to the thick solid line in FIG. 2) are all greater than 1000 ΩF.

Also, of the samples 2a to 2g, the sample 2e corresponding to the "roughly linear distribution (refer to the thick broken line in FIG. 2)" has a CR product (ΩF) of 610 ΩF. On the other hand, the CR products (ΩF) of the samples 2a to 2d, 2f, 2g corresponding to the distribution of roughly W shape (refer to the thick solid line in FIG. 2) are all greater than 610 ΩF.

Furthermore, of the samples 3a to 3g, the sample 3e corresponding to the "roughly linear distribution (refer to the thick broken line in FIG. 2)" has a CR product (ΩF) of 1060 ΩF. On the other hand, the CR products (ΩF) of the samples 3a to 3d, 3f, and 3g corresponding to the distribution of roughly W shape (refer to the thick solid line in FIG. 2) are all greater than 1060 ΩF.

In other words, the samples 1a to 1d, 1f, 1g, 2a to 2d, 2f, 2g, 3a to 3d, 3f, and 3g corresponding to the distribution of roughly W shape (refer to the thick solid line in FIG. 2) can prevent the CR product from dropping with certainty.

(2) Of the samples 1a to 1d, 1f, and 1g corresponding to the distribution of roughly W shape (refer to the thick solid line in FIG. 2), the sample 1a has a CR product (ΩF) which is 40.0% greater than the CR product (ΩF) of the sample 1e, sample 1b has a CR product (ΩF) which is 34.0% greater than the CR product (ΩF) of the sample 1e, sample 1c has a CR product (ΩF) which is 22.0% greater than the CR product (ΩF) of the sample 1e, sample 1d has a CR product (ΩF) which is 4.0% greater than the CR product (ΩF) of the sample 1e, sample 1f has a CR product (ΩF) which is 38.0% greater than the CR product (ΩF) of the sample 1e, and sample 1g has a CR product (ΩF) which is 33.0% greater than the CR product (ΩF) of the sample 1e.

Also, of the samples 2a to 2d, 2f, and 2g corresponding to the distribution of roughly W shape (refer to the thick solid line in FIG. 2), the sample 2a has a CR product (ΩF) which is 62.3% greater than the CR product (ΩF) of the sample 2e, sample 2b has a CR product (ΩF) which is 39.3% greater than the CR product (ΩF) of the sample 2e, sample 2c has a CR product (ΩF) which is 19.7% greater than the CR product (ΩF) of the sample 2e, sample 2d has a CR product (ΩF) which is 3.3% greater than the CR product (ΩF) of the sample 2e, sample 2f has a CR product (ΩF) which is 44.3% greater than the CR product (ΩF) of the sample 2e, and sample 2g has a CR product (ΩF) which is 37.7% greater than the CR product (ΩF) of the sample 2e.

Furthermore, of the samples 3a to 3d, 3f, and 3g corresponding to the distribution of roughly W shape (refer to the thick solid line in FIG. 2), the sample 3a has a CR product (ΩF) which is 22.6% greater than the CR product (ΩF) of the sample 3e, sample 3b has a CR product (ΩF) which is 20.8% greater than the CR product (ΩF) of the sample 3e, sample 3c has a CR product (ΩF) which is 19.8% greater than the CR product (ΩF) of the sample 3e, sample 3d has a CR product (ΩF) which is 4.7% greater than the CR product (ΩF) of the sample 3e, sample 3f has a CR product (ΩF) which is 19.8% greater than the CR product (ΩF) of the sample 3e, and sample 3g has a CR product (ΩF) which is 18.9% greater than the CR product (ΩF) of the sample 3e.

In other words, considering that the average thickness of the dielectric layer 13 is 1.0 µm for each of the samples 1a to 1d, 1f, and 1g, average thickness of the dielectric layer 13 is 0.8 µm for each of the samples 2a to 2d, 2f, and 2g, and average thickness of the dielectric layer 13 is 3.0 µm for each of the samples 3a to 3d, 3f, and 3g, the smaller the average thickness of the dielectric layer 13, or specifically when the average thickness of the dielectric layer 13 is 1.0 µm or less, the greater the CR-product increasing effect becomes and consequently any drop in CR product can be prevented with greater certainty.

(3) It is evident from the explanation in (2) above that, of the samples 1a to 1d, 1f, and 1g corresponding to the distribution of roughly W shape (refer to the thick solid line in FIG.

2), the sample 1d has an increment (4.0%) of CR product (ΩF) which is lower than the increments (22.0% or more) of the other samples 1a to 1c, 1f, and 1g.

Furthermore, of the samples 2a to 2d, 2f, and 2g corresponding to the distribution of roughly W shape (refer to the thick solid line in FIG. 2), the sample 2d has an increment (3.3%) of CR product (ΩF) which is lower than the increments (19.7% or more) of the other samples 2a to 2c, 2f, and 2g.

Also, of the samples 3a to 3d, 3f, and 3g corresponding to the distribution of roughly W shape (refer to the thick solid line in FIG. 2), the sample 3d has an increment (4.7%) of CR product (ΩF) which is lower than the increments (18.9% or more) of the other samples 3a to 3c, 3f, and 3g.

In other words, considering the tolerance (approx. ±5.0%) of CR product (ΩF) that may occur during manufacturing, the samples 1a to 1c, 1f, and 1g are suitable for practical use among the samples 1a to 1d, 1f, and 1g, samples 2a to 2c, 2f, and 2g are suitable for practical use among the samples 2a to 2d, 2f, and 2g, and samples 3a to 3c, 3f, and 3g are suitable for practical use among the samples 3a to 3d, 3f, and 3g.

When the above is translated to the values of (Cp−Co)/Co (%) and (Cp−Cs)/Cs (%), the samples 1a to 1c, 1f, and 1g whose (Cp−Co)/Co (%) is 3.2% or more and (Cp−Cs)/Cs (%) is 3.0% or more are suitable for practical use among the samples 1a to 1d, 1f, 1g, samples 2a to 2c, 2f, and 2g whose (Cp−Co)/Co (%) is 3.4% or more and (Cp−Cs)/Cs (%) is 3.1% or more are suitable for practical use among the samples 2a to 2d, 2f, 2g, and samples 3a to 3c, 3f, and 3g whose (Cp−Co)/Co (%) is 3.1% or more and (Cp−Cs)/Cs (%) is 3.0% or more are suitable for practical use among the samples 3a to 3d, 3f, and 3g. In summary, enough CR-product increasing effect suitable for practical use can be achieved, and consequently any drop in CR product can be prevented with great certainty, so long as (Cp−Co)/Co (%) is 3.1% or more and (Cp−Cs)/Cs (%) is 3.0% or more.

It should be noted that, while the maximum value of (Cp−Co)/Co (%) is indicated as 16.0% (refer to sample 2f) and maximum value of (Cp−Cs)/Cs (%) as 7.7% (refer to sample 1a) in FIG. 3, CR-product increasing effect suitable for practical use should be achievable even when (Cp−Co)/Co (%) is more than 16.0%, such as 30.0%, and when (Cp−Cs)/Cs (%) is more than 7.7%, such as 20.0%, given the numerical trend of CR product (ΩF), etc.

(4) Of the samples 1a to 1d, 1f, and 1g corresponding to the distribution of roughly W shape (refer to the thick solid line in FIG. 2), the sample 1a has a difference between (Cp−Co)/Co (%) and (Cp−Cs)/Cs (%) of 4.4%, sample 1b has a difference between (Cp−Co)/Co (%) and (Cp−Cs)/Cs (%) of 3.3%, sample 1c has a difference between (Cp−Co)/Co (%) and (Cp−Cs)/Cs (%) of 0.2%, sample 1d has a difference between (Cp−Co)/Co (%) and (Cp−Cs)/Cs (%) of 0.1%, sample 1f has a difference between (Cp−Co)/Co (%) and (Cp−Cs)/Cs (%) of 11.7%, and sample 1g has a difference between (Cp−Co)/Co (%) and (Cp−Cs)/Cs (%) of 6.1%.

Also, of the samples 2a to 2d, 2f, and 2g corresponding to the distribution of roughly W shape (refer to the thick solid line in FIG. 2), the sample 2a has a difference between (Cp−Co)/Co (%) and (Cp−Cs)/Cs (%) of 7.3%, sample 2b has a difference between (Cp−Co)/Co (%) and (Cp−Cs)/Cs (%) of 4.4%, sample 2c has a difference between (Cp−Co)/Co (%) and (Cp−Cs)/Cs (%) of 0.3%, sample 2d has a difference between (Cp−Co)/Co (%) and (Cp−Cs)/Cs (%) of 0.1%, sample 2f has a difference between (Cp−Co)/Co (%) and (Cp−Cs)/Cs (%) of 12.5%, and sample 2g has a difference between (Cp−Co)/Co (%) and (Cp−Cs)/Cs (%) of 7.9%.

Furthermore, of the samples 3a to 3d, 3f, and 3g corresponding to the distribution of roughly W shape (refer to the thick solid line in FIG. 2), the sample 3a has a difference between (Cp−Co)/Co (%) and (Cp−Cs)/Cs (%) of 3.1%, sample 3b has a difference between (Cp−Co)/Co (%) and (Cp−Cs)/Cs (%) of 1.3%, sample 3c has a difference between (Cp−Co)/Co (%) and (Cp−Cs)/Cs (%) of 0.1%, sample 3d has a difference between (Cp−Co)/Co (%) and (Cp−Cs)/Cs (%) of 0.1%, sample 3f has a difference between (Cp−Co)/Co (%) and (Cp−Cs)/Cs (%) of 8.3%, and sample 3g has a difference between (Cp−Co)/Co (%) and (Cp−Cs)/Cs (%) of 4.6%.

In other words, when the capacitances of the unit capacitors UC1 and UC99 on both sides in the laminating direction are smaller than the capacitance of the unit capacitor UC50 at the center in the laminating direction, then the greater the difference between (Cp−Co)/Co (%) and (Cp−Cs)/Cs (%), or specifically when the difference between (Cp−Co)/Co (%) and (Cp−Cs)/Cs (%) is 1.3% or more, the greater the CR-product increasing effect becomes and consequently any drop in CR product can be prevented with greater certainty.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2012-214219, filed Sep. 27, 2012 and No. 2013-169766, filed Aug. 19, 2013, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:
1. A multilayer ceramic capacitor comprising a capacitor body of a structure where multiple internal electrode layers are laminated via dielectric layers, wherein a part constituted by two adjacent internal electrode layers in a laminating direction and one dielectric layer present between the two internal electrode layers is defined as a unit capacitor, and capacitances of multiple unit capacitors arranged in the laminating direction exhibit a distribution that gradually increases from both ends of the multiple unit capacitors in the laminating direction toward an inside thereof, reaching apexes of increase, respectively, and gradually decreasing from the respective two apexes toward a center of the multiple unit capacitors in the laminating direction,
wherein when an average capacitance of the unit capacitors at both ends in the laminating direction is expressed as Co, average capacitance of the unit capacitors corresponding to the two apexes of increase is expressed as Cp, and capacitance of the unit capacitor at the center in the laminating direction is expressed as Cs, then (Cp−Co)/Co (%) is 3.1% or more and (Cp−Cs)/Cs (%) is 3.0% or more.

2. A multilayer ceramic capacitor according to claim 1, wherein capacitances of the unit capacitors at both ends in the laminating direction are smaller than a capacitance of the unit capacitor at the center in the laminating direction.

3. A multilayer ceramic capacitor according to claim 1, wherein an average thickness of the dielectric layer is 1.0 μm or less.

4. A multilayer ceramic capacitor according to claim 2, wherein an average thickness of the dielectric layer is 1.0 μm or less.

5. A multilayer ceramic capacitor comprising a capacitor body of a structure where multiple internal electrode layers are laminated via dielectric layers, wherein a part constituted by two adjacent internal electrode layers in a laminating direction and one dielectric layer present between the two internal electrode layers is defined as a unit capacitor, and capacitances of multiple unit capacitors arranged in the laminating direction exhibit a distribution that gradually increases from both ends of the multiple unit capacitors in the laminating direction toward an inside thereof, reaching apexes of increase, respectively, and gradually decreasing from the respective two apexes toward a center of the multiple unit capacitors in the laminating direction, wherein when an average capacitance of the unit capacitors at both ends in the laminating direction is expressed as Co, average capacitance of the unit capacitors corresponding to the two apexes of increase is expressed as Cp, and capacitance of the unit capacitor at the center in the laminating direction is expressed as Cs, then a difference between (Cp−Co)/Co (%) and (Cp−Cs)/Cs (%) is 1.3% or more.

6. A multilayer ceramic capacitor according to claim 5, wherein capacitances of the unit capacitors at both ends in the laminating direction are smaller than a capacitance of the unit capacitor at the center in the laminating direction.

7. A multilayer ceramic capacitor according to claim 5, wherein an average thickness of the dielectric layer is 1.0 μm or less.

8. A multilayer ceramic capacitor according to claim 6, wherein an average thickness of the dielectric layer is 1.0 μm or less.

9. A multilayer ceramic capacitor according to claim 1, wherein a number of the internal electrode layers is 100 or more.

10. A multilayer ceramic capacitor according to claim 2, wherein a number of the internal electrode layers is 100 or more.

11. A multilayer ceramic capacitor according to claim 5, wherein a number of the internal electrode layers is 100 or more.

12. A multilayer ceramic capacitor according to claim 6, wherein a number of the internal electrode layers is 100 or more.

13. A multilayer ceramic capacitor according to claim 1, wherein each of the dielectric layers is made of the same material and thickness of each of the dielectric layers is roughly the same.

14. A multilayer ceramic capacitor according to claim 2, wherein each of the dielectric layers is made of the same material and thickness of each of the dielectric layers is roughly the same.

15. A multilayer ceramic capacitor according to claim 5, wherein each of the dielectric layers is made of the same material and thickness of each of the dielectric layers is roughly the same.

16. A multilayer ceramic capacitor according to claim 6, wherein each of the dielectric layers is made of the same material and thickness of each of the dielectric layers is roughly the same.

* * * * *